United States Patent [19]
Schultze et al.

[11] Patent Number: 6,001,464
[45] Date of Patent: Dec. 14, 1999

[54] WATER VAPOR PERMEABLE BREATHABLE FILMS AND THEIR USE

[75] Inventors: Dirk Schultze, Fallingbostel; Nicole Hargarter, Hamburg; Hans-Werner Funk, Bomlitz, all of Germany

[73] Assignee: Bayer Aktiengesellschaft, Leverkusen, Germany

[21] Appl. No.: 08/129,877

[22] Filed: Sep. 30, 1993

[30] Foreign Application Priority Data

Oct. 7, 1992 [DE] Germany ............................. 42 33 654
Mar. 1, 1993 [DE] Germany ............................. 43 06 276

[51] Int. Cl.⁶ .................................................. B32B 27/36
[52] U.S. Cl. ................. 428/220; 428/423.1; 428/423.3; 428/480; 524/539; 525/440; 264/46.8
[58] Field of Search ........................... 525/440; 428/220, 428/423.1, 423.3, 480; 524/539; 264/46.8

[56] References Cited

U.S. PATENT DOCUMENTS

| | | |
|---|---|---|
| 3,904,706 | 9/1975 | Hoeschele . |
| 4,725,481 | 2/1988 | Ostapchenko . |
| 5,149,589 | 9/1992 | Naritomi ................................. 525/440 |
| 5,254,641 | 10/1993 | Alex ........................................ 525/424 |

FOREIGN PATENT DOCUMENTS

| | | |
|---|---|---|
| 0265922 | 5/1988 | European Pat. Off. . |
| 2412591 | 9/1974 | Germany . |

*Primary Examiner*—Patricia A. Short
*Attorney, Agent, or Firm*—Sprung Kramer Schaefer & Briscoe

[57] ABSTRACT

The invention relates to an extruded single-layer copolyetherester film with improved permeability to water vapor coupled with favorable mechanical properties, high elasticity and good surface slip so that it does not block on machinery.

10 Claims, No Drawings

WATER VAPOR PERMEABLE BREATHABLE FILMS AND THEIR USE

This invention relates to a copolyetherester film having a softening range of $\geq 150°$ C., of which the characteristic features are that it consists of at least one copolyetherester resin and at least one other thermoplastic polyurethane resin and that the film may advantageously contain an antiblocking agent and/or a lubricant.

More particularly, the invention relates to an extruded copolyetherester film having improved permeability to water vapor while remaining impermeable to water.

The invention also relates to the use of such films in laminates, particularly in the gas- and/or liquid-impermeable covering of porous sheet-form materials.

Copolyetheresters and thermoplastic polyurethanes belong to the class of thermoplastic elastomers. Thermoplastic elastomers are generally block copolymers of which the macroscopic property spectrums are a combination of the properties of the individual block-forming components. A broad synopsis of this class of materials is provided by Legge in Rubber Chemistry and Technology 62 (1989), 529–547.

Copolyetheresters are block copolymers made of ester and ether segments. In this group, the mechanical strength and superior high chemical resistance of polyesters are combined with the flexible character of polyethers. Although there is an almost infinite variety of possible molecular units for both types of segments, certain types are still preferably used. The polyesters are preferably the esters of terephthalic acid, generally ethylene or butylene terephthalates. In the case of the ether segments, the glycols based on ethylene and propylene oxide as well as tetrahydrofuran are favoured structural units.

The properties of the individual components mentioned above are described in the relevant literature, for example by Petrik, Bohdanecky, Hobodas and Simek in Journal of Applied Polymer Science 42 (1991), 1759–1765, or Radhakrishnan, Saini and Kuber in European Polymer Journal 27 (1991), 291–297.

The macroscopic properties are controlled by the molecular units but also depend on—as with all partly crystalline polymers—upon the supermolecular structure. The latter is dependent not only on the chemical composition, i.e. in the case of block copolymers on the size and distribution of the particular blocks, but also on the thermomechanical history, particularly the processing conditions. Detailed descriptions of copolyetheresters and the possible forms of their supermolecular structures are provided inter alia by Adams and Hoeschele or Wegener in Thermoplastic Elastomers, Legge, Holden and Schroeder (eds.), Hanser Verlag, München 1987.

Thermoplastic polyurethanes have also been known for some time and are characterized by high chemical resistance. Their three basic components are diisocyanates, short-chain diols (also known as chain extenders) and long-chain diols, the latter contributing to the elastic properties of the thermoplastic polyurethanes. Instead of using diols alone, small quantities of alcohols with higher amount of functional groups are sometimes added in order to partly crosslink the otherwise linear molecular chains with one another. The wide choice of raw materials in each of the three educt groups mentioned explains why there are so many possible methods of chemically synthesizing thermoplastic polyurethanes and hence varying their properties.

In commercial thermoplastic polyurethanes, good strength values, i.e. tensile strength and tear propagation resistance, are generally combined with high elasticity, i.e. high elongation at break and flexibility at low temperatures. A synopsis of the chemical composition, production, properties and potential applications of thermoplastic polyurethanes is provided, for example, by Goyert and Hespe in Kunststoffe 68 (1978), 819–825 or Hepburn (ed.) in Polyurethane Elastomers, Applied Science Publishers, Barking 1982.

The use of microporous films as breathable, but waterproof membranes which are produced by stretching or by coagulation from solution has been known for some time. However, non-porous films with high breathability are preferred if the film is to combine its high permeability with favorable mechanical properties. Nonporous films are also preferably used in the health care or sanitary field in order to prevent contamination with bacteria and soiling. Nonporous films are preferably produced by processing from the melt.

Processing to films can be carried out by cast film extrusion or blown film extrusion, as described for example in Kirk-Othmer, Encyclopedia of Chemical Technology 9 (1966), 232–241. Thus, films can be produced in thicknesses of a few micrometers to a few millimeters. Cast film extrusion has the advantage over blown film extrusion that films can be produced with improved thickness tolerances and in greater thicknesses.

It is known from the relevant literature, for example Komerska, J. Plast. Film Sheeting, 3 (1987), 58–64 that material processed from the melt has higher permeabilities to water vapor than the same material processed from solution.

It is known that thermoplastic linear copolyetherester elastomers are suitable for processing from known inter alia from U.S. Pat. No. 3,023,192 (Shivers), U.S. Pat. No. 3,651,014 (Witsiepe) and U.S. Pat. No. 3,775,374 (Wolfe) and also from Nishimura et al. "Elastomers Based on Polyester", J. Macromol. Sci. (Chem.), A1 4 (1967), 617–625 or Wolfe, "Elastomeric Polyetherester Block Copolymers", American Chemical Society Advances in Chemistry, 176 (1979) 129–151. These elastomers basically consist of long-chain ether units which form the "soft segment" and short-chain ester units which form the "hard segment".

It is known that the short-chain ester units form the skeletal structure responsible for mechanical strength. The matrix of long-chain ether segments with preferably low hydrocarbon to oxygen ratios incorporated in this skeletal structure allows individual water molecules to pass through and hence provides for permeability to water vapor. Ether segments with low carbon-to-oxygen ratios in particular show a high affinity for water vapor, as described for example by Petrik et al. in J. Appl. Polym. Sci. 42 (1991), 1759–1765. However, the matrix consisting of ether segments is impermeable to associations of water molecules, such as drops. Accordingly, films of such materials are breathable, but water-proof.

Extrudable waterproof copolyetherester compositions permeable to water vapor are described by Samejima in Japanese patent publication 51–111290, Vrouenrats et al. in EP 0 111 360 B1 and by Ostapchenko in EP 0 265 922 B1. However, the permeabilities to water vapor described by Vrouenrats et al. in the EP 0 111 360 B1 are unsatisfactory so that there was a need to provide films in which this property would be improved.

One disadvantage of this concept of breathable, but waterproof materials is that any increase in permeability to water vapor, generally achieved by an increase in the percentage content of ether segments in the copolyetherester formulation, is accompanied by a reduction in the number of ester units so that the mechanical strength is reduced.

If nonporous films are used for covering porous sheet-form materials in order to adapt them to a given mold by application of a pressure gradient, as is the case for example in vacuum forming processes, the mechanical strength and, above all, the elongation at break of the film material also have to satisfy increased requirements. The forming process often has to be supported by subsequent guiding of the film. However, the film should not block on the guidance so that friction between the film and the guidance has to be minimized. The difficulties involved in such applications are discussed, for example, by Ostertag in "Kunststoffe in technischen Wachstumsbranchen", SKZ-Fachtagung, Süddeutsches Kunststoffzentrum, Würzburg (1991), 109–126.

Continuing the further development of existing technical film systems, the problem addressed by the present invention was to provide a nonporous breathable film showing good mechanical strength, high elongation at break and can be easily shaped.

Another problem addressed by the invention was to provide a film formulation which would be easier to process and of which the raw materials would be less expensive, so that the film in question could also be produced more economically. Despite intensive efforts by experts to provide a film having such a performance spectrum, no such film has hitherto been available.

The problem stated above has been solved by a film of the type mentioned at the beginning which is characterized in that the film of copolyetherester elastomer additionally contains a thermoplastically processable segmented polyurethane resin in a quantity of 5 to 40% by weight, based on the total weight of copolyetherester and polyurethane resin. It could not have been logically assumed by experts that a film such as this would have a permeability to water vapor of at least 1000 g/m$^2$d, as measured in accordance with DIN 53 122 at 23° C./85% relative air humidity.

The copolyetherester elastomer has a Shore D hardness of 30 to 55 and preferably 40 to 50 and a melt flow rate of 10 to 20 g/10 mins., as measured in accordance with ASTM D 1238 at 220° C. under a load of 2.16 kg.

The thermoplastically processable segmented polyurethane has a Shore D hardness of 25 to 60 and preferably 30 to 50 and a melt flow rate of 5 to 30 g/10 mins., as measured at 190° C. under a load of 8.7 kg.

Contrary to the general assumption, the water vapor permeability values of films of such copolyetherester/polyurethane mixtures are not among the permeability values of the particular pure raw material components used, but in fact exceed them.

The synergistic effect of the mixtures according to the invention remains intact even when the additives and processing aids required for production from the melt, such as lubricants or antiblocking agents, are added.

Neither does the use of stabilizers or pigments in the typical concentrations used to establish or to maintain the performance properties of plastics produce any deterioration in the properties according to the invention. In addition, through the use of the less expensive raw material component of thermoplastic polyurethane elastomer resins compared with the expensive copolyetherester, the film according to the invention can also be produced with lower raw material costs and hence more economically.

The resin present in the copolyetherester matrix is a high molecular weight segmented synthetic polyurethane resin having a softening point of >140° C. (as determined by adhesion tests on a Kofler bench) which is added in a quantity of 5 to 40% by weight and preferably 10 to 20% by weight (based on the total weight of the film). It has surprisingly been found that the incorporation of a thermoplastic elastomer resin having such a softening point (>140° C.) in the copolyetherester increases its permeability to water vapor and hence the breathable character of the film is considerably improved, while at the same time the touch, skin compatibility and mechanical properties of the film are favorably influenced, the films may be shaped easily. The films according to the invention also show excellent release properties if manufactured in the blown-film process. In addition, the surface tension of the films according to the invention can be increased by a corona pretreatment which is of advantage to the adhesion properties during subsequent processing. In addition, it has been found that the surface slip properties of the film according to the invention make it particularly suitable for vacuum forming with subsequent guiding.

The surface of the film is smooth enough to prevent blocking on the guidance. At the same time, however, the surface of the film also has the necessary roughness to prevent slipping on the machine and hence forming of folds during lamination.

In order permanently to establish certain properties of the film according to the invention, it may contain suitable additives in effective quantities, preferably hydrolysis stabilizers and/or photostabilizers and/or antioxidants.

The hydrolysis stabilizers used are preferably carboimides, particularly in the form of non-extractable polycarbodiimides, and hydroxyethyl ureas.

The antioxidants used are so-called primary antioxidants, secondary amines sterically hindered by substitution at the nitrogen and/or sterically hindered phenols, and also secondary antioxidants, such as thioethers, phosphites or phosphonites or even synergistic mixtures or primary and secondary antioxidants.

Light-absorbing compounds, particularly UV-absorbing benzoates and/or phenyl salicylates, and also benzotriazoles and substituted acylates are used for light stabilization. Quenchers, preferably nickel organoyl chelates and/or nickel dithiocarbamates, may also be used for light stabilization.

The stabilizer systems suitable for the here mentioned plastics are described, for example, in Rek, Bravar: J. Elast. Plast. 12 (1980), 245.

Certain properties of the film according to the invention can be further improved by other additives in effective quantities, preferably lubricants and antiblocking agents.

Carboxylic acid amides, such as erucic acid amides, stearic acid amides and palmitic acid amides, or polydiorganyl siloxanes and also fluorine elastomers and inorganic lubricants, such as $MOS_2$, and salts of stearic acid are preferably used as lubricants.

Suitable antiblocking agents are, for example, organic polymers incompatible with the film matrix or inorganic materials, such as silicates, silicon dioxide and calcium carbonate. Inorganic materials, particularly silicon dioxide with an average particle size of 1 to 10 pm, have proved to be particularly suitable antiblocking agents. The antiblocking agents are added in quantities of 0.5 to 6% by weight and preferably in quantities of 2 to 4% by weight, based on the average weight of the film.

Additives for plastics are described, for example, in Gächter/Müller: Kunststoff-Additive, Carl Hanser Verlag München, 3rd Edition (1989).

The surface properties are modified by any of the usual pretreatments before the film is wound up, for example by flame treatment or by electric corona pretreatment. In the corona pretreatment, which may be carried out by any of the known methods, the film is expediently passed between two conductor elements serving as electrodes, the voltage applied between the electrodes being as high (normally an a.c. voltage of about 10 kV with a frequency of 10 KHz) that spray or corona discharges can occur. Under the effect of these discharges, the air above the film surface is ionized so that reactions take place over the surface of the film in which polar incorporations are formed in the considerably less polar polymer matrix. The treatment intensities are within the usual limits, treatment intensities which give surface tensions of 38 to 46 mN/m being preferred.

The invention is illustrated by the following Examples (for a comparison of the Examples, see Table 1).

EXAMPLE 1

An opaque film with a total thickness of 30 $\mu$m was produced using a blown film extrusion line. The film consisted of copolyetherester elastomer with addition of 20% by weight polyurethane, 0.6% by weight lubricant (Hoechstwachs C, a product of Hoechst AG, Frankfurt-on-Main, FRG), 0.08% by weight calcium stearate and 3.5% by weight $SiO_2$, based on the mixture of components.

The commercial copolyetherester elastomer had a Shore D hardness of 44, as measured in accordance with ASTM D 2240, and a melt flow rate of 15 g/10 mins., as measured in accordance with ASTM D 1238 at 220° C. under a load of 2.16 kg. 60% by weight of the copolyetherester elastomer, related to the whole amount of copolyetherester elastomer, consisted of long-chain ether segments with a carbon to oxygen ratio of 1.8–2.2 and 40% by weight of short-chain ester units of which the basic unit is terephthalic acid.

The polyurethane had a Shore D hardness of 32 and a melt flow rate of 7 g/10 mins., as measured at 190° C. under a load of 8.7 kg. The polyurethane was a polyester urethane with long-chain ester units with a carbon to oxygen ratio of 2.3–2.7. The urethane units are formed from an aromatic diisocyanate and a short-chain aliphatic diol with a carbon to oxygen ratio of 2.

EXAMPLE 2

A film was produced as in Example 1, but with a polyurethane having a Shore D hardness of 54 and a melt flow index of 16 g/10 mins., as measured at 190° C. under a load of 8.7 kg. The polyurethane was formed from long-chain ester units with a carbon to oxygen ratio of 2.3–2.7. As above the urethane units were formed from an aromatic diisocyanate and a short-chain aliphatic diol with a carbon to oxygen ratio of 2. Accordingly, the percentage polyurethane content was 20% by weight.

EXAMPLE 3

A film was produced as in Example 1, but with a polyurethane having a Shore D hardness of 42 and a melt flow index of 19 g/10 mins., as measured at 190° C. under a load of 8.7 kg. The polyurethane was formed from long-chain ether units with a carbon to oxygen ratio of 3.8 to 4.5, aromatic diisocyanates and an aliphatic chain extender with a carbon to oxygen ratio of 2. The percentage polyurethane content was 20% by weight.

EXAMPLE 4

A film was produced as in Example 1, but with 10% by weight polyurethane (the polyurethane used was the same as in Example 1).

Comparative Example 1

A film was produced as in Example 1, but without addition of the polyurethane used in Example 1.

Comparative Example 2

A film was produced as in Example 1, but solely from polyurethane with additions of 0.6% lubricant, 0.08% calcium stearate and 3.5% $SiO_2$, based on the mixture of the components.

| | WVT g/m²d | Tensile strength N/mm² | | Tear propagation resistance N/mm | | Friction coefficient | | Softening | Elongation at break | | Tension at 50% Elongation N/mm² | |
|---|---|---|---|---|---|---|---|---|---|---|---|---|
| | DIN 53122 | Longi-tudinal | Trans-verse | Longi-tudinal | Trans-verse | DIN 53375 | Foam adhesion | range ° C. | Longi-tudinal | Trans-verse | Longi-tudinal | Trans-verse |
| Ex.1 | 1200 | 24 | 20 | 61 | 65 | 0.66 | ++ | 158–163 | 610 | 650 | 7.1 | 6.7 |
| Ex.2 | 1010 | 23 | 21 | 65 | 68 | 0.70 | ++ | 161–165 | 590 | 620 | 7.3 | 6.8 |
| Ex.3 | 1320 | 18 | 15 | 64 | 67 | 0.62 | ++ | 168–174 | 730 | 840 | 6.7 | 6.5 |
| Ex. 4 | 1270 | 25 | 22 | 68 | 73 | 0.54 | ++ | 169–174 | 660 | 690 | 8.3 | 7.6 |
| Comp. Ex. 1 | 890 | 21 | 19 | 79 | 80 | 0.82 | + | 172–174 | 450 | 650 | 8.9 | 8.2 |
| Comp. Ex. 2 | 150 | 78 | 67 | 71 | 80 | 0.44 | ++ | 137–147 | 400 | 450 | 7.0 | 6.1 |

It is obvious from Table 1 that the films according to the invention are superior to the comparison films in regard to the desired property profile.

Determination of Water Vapor Transmission (WVT)

The water vapor transmission is determined in accordance with DIN 53 122 at a temperature of 23° C. (85% relative humidity).

Determination of Tear Propagation Resistance

Tear propagation resistance is determined in accordance with DIN 53 515. The test specimens used are angular samples with incisions according to ISO 34, method B.

Determination of Tensile Strength and Elongation at Break as well as the Tension at 50 % Elongation Tear strength and elongation at break are determined in accordance with DIN 53 544. Test strips with a length between the clamps of 50 mm are used. The tension at 50 % Elongation is a measure for the good shaping behavior.

Determination of Friction Coefficient

The dimensionless friction coefficient is determined in accordance with DIN 53 375 (metal/film contact).

Determination of Foam Adhesion

Foam adhesion is determined in a standard conditioning atmosphere. The film is brought into contact with a reactive polyurethane foam. After curing of the foam, adhesion is evaluated in accordance with the following criteria by peeling the foam from the film:

| Assessment | Damage pattern |
|---|---|
| ++ = Excellent | (polyurethane foam adheres com-completely to the film) |
| + = Good | (Some separation of the foam at the edges) |
| − = Poor | (Extensive separation of the foam) |
| −− = Very poor | (complete separation of the foam) |

Determination of the Softening Range

The softening range is determined on a Kofler heating bench. A piece of film sized 30×200 mm is placed on the Kofler heating bench. After 30 seconds, the film is removed, starting from the lower temperature end. The region in which the film adheres to the surface of the Kofler heating bench indicates the softening range.

We claim:

1. An extruded homogeneous, water-proof and breathable film, comprising at least two different thermoplastic elastomer resin components, one of which is a copolyetherester elastomer and the other a thermoplastically processable segmented polyurethane elastomer, the copolyetherester elastomer component making up 60 to 95% by weight and the thermoplastic polyurethane resin component making up 5 to 40% by weight, relating to the total mixture of the components used.

2. A film according to claim 1, additionally containing about 0.3 to 1% by weight of lubricants and waxes, related to the mixture as a whole.

3. A film according to claim 1, additionally containing about 2 to 5% by weight of an inorganic filler, based on the mixture as a whole.

4. A film according to claim 1, having a thickness of 15 to 100 μm.

5. A film according to claim 1, consisting essentially of 80 to 90% by weight of the copolyetherester elastomer component, 10 to 20% by weight of the thermoplastic polyurethane component, about 0.5 to 0.7% by weight of lubricants and waxes, and about 3 to 4% by weight of an inorganic filler, and having a thickness of 30 to 50 μm.

6. A fluid medium sealed off by a film according to claim 1.

7. A textile-sheet covered by a film according to claim 1.

8. A reacted foam system sealed by a film according to claim 1.

9. In the forming of a reacted foam system sealed by a film, wherein a film is vacuum formed into a predetermined shape and a foam is formed within such shape from a reactive foam system, the improvement wherein such film comprises a film according to claim 1.

10. A seat element including a film according to claim 1.

* * * * *